United States Patent [19]

Fusey

[11] 3,933,627

[45] Jan. 20, 1976

[54] PROCESS FOR BIOLOGICALLY ELIMINATING ORGANIC WASTE MATTER

[75] Inventor: Pierre Fusey, Paris, France

[73] Assignee: Banque pour l'Expansion Industrielle "Banexi", Paris, France

[22] Filed: Feb. 15, 1974

[21] Appl. No.: 442,897

Related U.S. Application Data

[63] Continuation of Ser. No. 259,850, June 5, 1972, abandoned.

[30] Foreign Application Priority Data

June 28, 1971 France .............................. 71.23459

[52] U.S. Cl. ................................... 210/11; 195/3 H
[51] Int. Cl.² .......................................... B01J 13/00
[58] Field of Search ....... 210/11, 2; 195/3 H, 2.8 R, 195/103.5 P, 91, 100

[56] References Cited

UNITED STATES PATENTS

| | | | |
|---|---|---|---|
| 2,436,596 | 2/1948 | Noakes et al. | 117/83 X |
| 3,489,648 | 1/1970 | Wegner | 195/2.8 R |
| 3,546,071 | 12/1970 | Douros et al. | 195/100 X |
| 3,714,063 | 1/1973 | Salomone | 210/11 |
| 3,728,279 | 4/1973 | Salomone | 210/11 |

OTHER PUBLICATIONS

Berkman et al., Emulsions and Foams; Reinhold Pub. Co., 1941, pp. 29, 174, 175 and 189.

*Primary Examiner*—Charles N. Hart
*Assistant Examiner*—Benoit Castel
*Attorney, Agent, or Firm*—Young & Thompson

[57] ABSTRACT

The present invention relates to the elimination by biological means of organic waste matter of household or industrial origin or petroleum waste matter. According to the invention the needs in carbon, nitrogen, phosphorus and trace elements of specific aerobic micro-organisms of the waste material to be eliminated and the optimum pH are determined experimentally, the content of each of these nutritive elements in the waste material to be eliminated is analysed, the said waste matter is placed in suspension in water and at least nitrogen and phosphorus contents and the pH of the suspension are controlled by adding elements which contain them so that said contents and pH agree with those necessary to the specific micro-organisms of the said waste matter, and the suspension is aerated. The element added to control the nitrogen and phosphorus contents is mainly constituted by vinasses, of which the nitrogen content is controlled with ammonium nitrate, the phosphorus level with dicalcium phosphate and the carbon level with calcium carbonate. The waste matters to be eliminated are mainly cellulose waste matters and petroleum residues.

3 Claims, No Drawings

PROCESS FOR BIOLOGICALLY ELIMINATING ORGANIC WASTE MATTER

This is a continuation of application Ser. No. 259,850, filed June 5, 1972, now abandoned.

The present invention relates to the elimination by biological means of organic waste matter of household or industrial origin or petroleum waste matter. It is known that organic waste matters in suspension in water are, when the oxygenation of the water is sufficient, subjected to natural biodegradation under the influence of aerobic micro-organisms, but this biodegradation is slow because the aqueous milieu in which the waste matters are in suspension is often unsuitable or at the very least is not the best for the development of these micro-organisms.

In order to develop the micro-organisms need air, which requirement is generally met in a known manner by means of mixing and aerating. But they equally need carbon, nitrogen, phosphorus and trace elements in well defined proportions. The micro-organisms which are specific for the degradation of certain substances show maximum development when they are located in a specific pH medium. The technique of biological purification by the method referred to in the case of activated sludge is limited to artificial aeration of the aqueous suspension, which aeration makes it possible to meet the biochemical oxygen requirement but is insufficient as nutritive requirements of the micro-organisms which destroy organic substances by means of oxidation and mineralization are concerned. In order to compensate for this insufficiency in the known method it is necessary to recycle the activated sludge which is enriched in micro-organisms but this recycling leads to an increase in the volume which has to be treated.

It is moreover necessary when it is desired to eliminate such waste matters which per se constitute a source in certain of the nutritive elements which are necessary to the micro-organisms not to add to the medium large quantities of sources of the same nutritive elements which are more easily consumed by the said micro-organisms.

In addition the waste matters must be dispersed in stable suspension and it is impossible to subject to biological degradation certain waste matters such as petroleum waste matters unless they are likewise emulsified.

The present invention thus aims to provide a process for biologically eliminating organic waste matter in suspension in water by means of aerobic micro-organisms in which the suspension is diluted and which latter is aerated in order to satisfy the biochemical oxygen requirement, according to which the needs in carbon, nitrogen phosphorus and trace elements of specific aerobic micro-organisms of the waste material to be eliminated and the optimum pH are determined experimentally, the content of each of these nutritive elements in the waste material to be eliminated is analysed, the said waste matter is placed in suspension in water and at least nitrogen and phosphorus contents and the pH of the suspension are controlled by adding elements which contain them so that said contents and pH agree with those necessary to the specific micro-organisms of the said waste matter.

The present invention aims to provide in particular a process for eliminating cellulose waste matters, according to which the nitrogen content of the suspension containing them is controlled at 2 to 6% by dry weight of the said waste matter and the phosphorus content at 0,8 to 2% of the dry weight of the said waste matter.

The present invention likewise intends to provide a process for eliminating petroleum residues according to which the said residues are emulsified in water using a glue and the nitrogen content of the suspension containing them is controlled at 6 to 8% by weight of the said residues and the phosphorus content at 1 to 3% of the weight of the said residues.

According to the invention it is also possible to add to the suspension specific growth agents of the micro-organisms such as extracts of yeast.

Sources of carbon capable of making up for an insufficiency of carbon in the waste matter to be eliminated can be for example carbohydrates such as cellulose waste matter, (paper, textile waste, vegetable remains, etc.) and waste matter from sugar refining, malting, the maize industry, hydrocarbons such as petroleum residues, lipides such as residues from soap manufacture and food industries and alkaline or alkaline-earth carbonates.

A source of nitrogen capable of making up an insufficiency of nitrogen in the waste matters to be eliminated can be for example organic compounds of nitrogen such as urea, waste matter from foodstuffs, waste matter from foodstuffs industries (vinasse, waste matter from dairies, from tanneries, etc.) glue from bones, skins or fish and all ammonium salts such as nitrates, sulphates and phosphates of ammonium.

The phosphorus can be added in the organic form of animal waste matter or in the mineral form of alkaline or alkaline-earth phosphates.

Trace elements are present in numerous types of waste matter, for example in vinasses.

In order to emulsify in the water petroleum waste matters such as crude petroleum, resudual sludge, oils and grease, soluble oils etc. use is made of a biodegradable dispersing agent such as glues from bones, skins or fish and natural gums (tragacanth, arabic, etc.).

The present invention also intends to provide specific compositions for the elimination by means of biological degradation of specific waste matters, which are constituted principally by vinasses of which the nitrogen content is controlled with ammonium nitrate, the phosphorus level with dicalcium phosphate and the carbon level with calcium carbonate.

Vinasses are in fact cheap sources of nitrogen and trace elements as they themselves constitute distillation residues. They are moreover, unlike molasses, lacking in sugar and alcohol which are the sources of carbon most easily consumed by micro-organisms. Thus their presence does not interfere with the biological degradation of the carbonacous part of the waste matters.

The present invention also intends to provide a composition for the biological elimination of cellulose waste matters constituted in its active part by 50 to 70% by weight of vinasse, 0 to 30% by weight of ammonium nitrate and 15 to 30% by weight of dicalcium phosphate.

It likewise has as its object a composition for the biological elimination of petroleum residues constituted in its active part by 40 to 60% by weight of vinasse, 0 to 12% by weight of ammonium nitrate, 3 to 8% by weight of dicalcium phosphate, 25 to 40% by weight of calcium carbonate and 1 to 3% by weight of glue.

Ammonium nitrate can often be suppressed when the vinasses are very rich in nitrogen.

Active part is taken in the above to mean the part which intervenes in the process of biological elimination of waste matters, and it is quite clear that the compound can contain water or additional mineral or organic substances.

The present invention also intends to provide a process for eliminating cellulose waste matters in accordance with which a composition as above described is added at the rate of 10 to 35% by weight of the weight of cellulose waste matter which it contains, to an aqueous suspension with acid pH containing the said waste matter and the suspension is aerated.

It also has as it aim a process for eliminating petroleum residues according to which to 100 parts by weight of waste matter there are added 70 to 200 parts by weight of a composition as above described the mixture being stirred with 10 to 30 times its own weight of water, and the resultant emulsion being aerated.

There follows a description of examples of use of the invention.

EXAMPLE 1

To eliminate cellulose waste matters, waste matters from paper-making, papers, cellulose textile waste matters, a paste has been prepared constituted by :

| | |
|---|---|
| Vinasses from distillation of molasses | 60% |
| Ammonium nitrate | 20% |
| Dicalcium phosphate | 20% |

The waste matters have been placed in suspension in the water when there was still none (residual waters) and the suspension was acidified with nitric acid so as to have the optimum pH of 5.5.

To the suspension was added 20% by weight of the cellulose waste matters to be eliminated of the above composition. The suspension was aerated. After 30 days the cellulose waste matters had disappeared.

EXAMPLE 2

In order to eliminate petroleum residues constituted by residual sludge a paste was prepared constituted by :

| | |
|---|---|
| Vinasse | 39% |
| Ammonium nitrate | 7% |
| Dicalcium phosphate | 4% |
| Calcium carbonate | 29% |
| Glue (skins glue) | 1% |
| Water | 20% |

This paste was mixed in equal parts to the petroleum residues and the mixture was stirred with 20 times its own weight of water then the emulsion which was obtained was stored in a tank with forced aeration. After 25 days chromatography showed total degradation of the hydrocarbons.

EXAMPLE 3

In order to eliminate petroleum residues constituted by greasing oils a paste was prepared constituted by :

| | |
|---|---|
| Potassium vinasse | 15% |
| Magnesium vinasse | 30% |
| Dicalcium phosphate | 6% |
| Calcium carbonate | 30% |
| Glue (arabic gum) | 1% |
| Water | 18% |

This compound was added weight for weight to greasing oils and to the mixture was added 30 times its own weight of water. The emulsion was poured out over a soil constituted by a mixture of sand and gravel. After 60 days no trace of hydrocarbon was detected in the soil.

The embodiments described above by way of example can be modified in numerous ways without thereby exceeding the scope of the present invention.

What is claimed is:

1. A process for the elimination of petroleum residues by biodegradation, comprising adding to 100 parts by weight of said residue, 70 to 200 parts by weight of a composition consisting essentially of 40 to 60% by weight of vinasse, a substantial amount up to 12% by weight of an ammonium compound selected from the group consisting of ammonium nitrate, ammonium sulphate and ammonium phosphate, 3 to 8% by weight of a phosphate selected from the group consisting of alkali phosphate and alkaline earth phosphate, 25 to 40% by weight of a carbonate selected from the group consisting of alkali carbonate and alkaline earth carbonate, and 1 to 3% by weight of glue, mixing said composition with 10 to 30 times its weight of water to form an emulsion, and aerating said emulsion.

2. A process according to claim 1, in which said glue is a member selected from the group consisting of bone glue, skin glue, fish glue and natural gums.

3. A process as claimed in claim 1, in which said ammonium compound is ammonium nitrate, said phosphate is dicalcium phosphate and said carbonate is calcium carbonate.

* * * * *